United States Patent
Gong

(10) Patent No.: US 10,647,153 B2
(45) Date of Patent: May 12, 2020

(54) TIRE RIM STRUCTURE AND TIRE

(71) Applicant: CHENGDU YOUYANG ELECTROMECHANICAL PRODUCT DESIGN CO., LTD., Chengdu (CN)

(72) Inventor: Shugang Gong, Shenzhen (CN)

(73) Assignee: CHENGDU YOUYANG ELECTROMECHANICAL PRODUCT DESIGN CO., LTD., Chengdu (CN)

( * ) Notice: Subject to any disclaimer, the term of this patent is extended or adjusted under 35 U.S.C. 154(b) by 514 days.

(21) Appl. No.: 15/123,196

(22) PCT Filed: Mar. 12, 2014

(86) PCT No.: PCT/CN2014/073281
§ 371 (c)(1),
(2) Date: Sep. 1, 2016

(87) PCT Pub. No.: WO2015/135155
PCT Pub. Date: Sep. 17, 2015

(65) Prior Publication Data
US 2017/0066285 A1    Mar. 9, 2017

(51) Int. Cl.
*B60B 3/04* (2006.01)
*B60B 25/00* (2006.01)
*B60B 25/02* (2006.01)

(52) U.S. Cl.
CPC .......... *B60B 25/004* (2013.01); *B60B 25/006* (2013.01); *B60B 25/02* (2013.01);
(Continued)

(58) Field of Classification Search
CPC ....... B60B 25/04; B60B 25/02; B60B 25/004; B60B 25/006
(Continued)

(56) References Cited

U.S. PATENT DOCUMENTS

| | | | | |
|---|---|---|---|---|
| 1,593,877 | A | * 7/1926 | Littman | .................. B60B 25/02 |
| | | | | 152/404 |
| 4,142,569 | A | * 3/1979 | Walther | .................. B60B 11/06 |
| | | | | 152/376 |
| 4,706,723 | A | 11/1987 | Loeber et al. | |

(Continued)

FOREIGN PATENT DOCUMENTS

| CN | 1244467 | 2/2000 |
|---|---|---|
| CN | 2726923 | 9/2005 |

(Continued)

OTHER PUBLICATIONS

International Search Report for International Application No. PCT/CN2014/073281, dated Nov. 21, 2014, with English and Chinese, total 6 pages.

(Continued)

*Primary Examiner* — Scott A Browne
(74) *Attorney, Agent, or Firm* — Hamre, Schumann, Mueller & Larson, P.C.

(57) ABSTRACT

A tire rim structure including an annular inner ring provided on the inner ring of a tire body and a circular outer ring provided on the outside of the tire body, fixedly connected to the annular inner ring, and formed by stamping. The annular inner ring includes an annular inner ring body formed by extrusion, an annular left ring provided at one side of the annular inner ring body and formed by extrusion, and an annular right ring provided at the other side of the annular inner ring body, connected to the circular outer ring, and formed by extrusion. A shaft hole is provided at the middle part of the circular outer ring.

14 Claims, 3 Drawing Sheets

(52) U.S. Cl.
CPC ... *B60B 2310/206* (2013.01); *B60B 2310/214* (2013.01); *B60B 2310/302* (2013.01); *B60B 2900/111* (2013.01); *B60B 2900/115* (2013.01); *B60B 2900/116* (2013.01); *B60B 2900/311* (2013.01); *B60B 2900/513* (2013.01)

(58) Field of Classification Search
USPC .................................. 301/30, 29.2, 31, 10.1
See application file for complete search history.

(56) References Cited

U.S. PATENT DOCUMENTS

| | | | | |
|---|---|---|---|---|
| 5,435,629 | A | * | 7/1995 | Suzuki ............... B60B 3/002 |
| | | | | 301/11.1 |
| 5,441,334 | A | * | 8/1995 | Botterman ............. B60B 7/00 |
| | | | | 29/453 |
| 6,666,525 | B1 | * | 12/2003 | Schroepfer ............ B60B 1/00 |
| | | | | 301/80 |
| 2008/0277996 | A1 | * | 11/2008 | Ono .................. B60B 21/025 |
| | | | | 301/63.106 |

FOREIGN PATENT DOCUMENTS

| | | | | |
|---|---|---|---|---|
| CN | 101734100 | | 6/2010 | |
| CN | 201989561 | | 9/2011 | |
| DE | 1605544 A1 | * | 3/1971 | ............ B60B 25/04 |
| DE | 3446522 | | 6/1986 | |
| GB | 505886 A | * | 5/1939 | ............ B60B 21/02 |
| JP | S5898205 U | * | 7/1983 | ............ B60B 21/02 |
| JP | S5970803 U | * | 5/1984 | ............ B60B 21/02 |
| JP | 2008 126806 | | 6/2008 | |

OTHER PUBLICATIONS

European Patent Office Action dated Jun. 25, 2019 for European patent application No. 14885533.1, pp. 1-4.

* cited by examiner

TIRE RIM STRUCTURE AND TIRE

FIELD OF THE INVENTION

The present application relates to the technical field of automobiles, especially to a tire rim structure and a tire.

BACKGROUND OF THE INVENTION

An existing tire rim applied to a tubeless pneumatic tire is usually casted and formed integrally through casting technique. Since casting parts are prone to generating casting defects such as pores, sinkholes, shrinkage porosities. slag inclusions, and so on, consistency of the tire rim may be reduced, thus affecting structural strength of the rim directly, and reducing bearing, anti-fatigue and impact resistance performances of the rim. Furthermore, because casting parts are prone to generating the aforesaid casting defects and a structure of a rim is generally irregular with a plurality of curved surfaces, integral casting and formation technique for a rim is complex. The requirement for the technique is high, which brings certain trouble into production, therefore, the production efficiency is relatively low.

SUMMARY OF THE INVENTION

A purpose of the invention is to provide a tire rim structure and a tire, and aims to overcome the problem of a tire rim in the prior art that the tire rim is low in a structural strength and complex in manufacturing technique because of adopting integral casting and formation.

A technical solution of the application is that: a tire rim structure including an annular ring provided on the inner ring of a tire body and a circular outer ring provided on the outside of the tire body, fixedly connected to the annular ring, and formed by stamping; the annular ring includes an annular ring body formed by extrusion, an annular left ring provided at one side of the annular ring body and formed by extrusion, and an annular right ring provided at the other side of the annular ring body, connected to the circular outer ring, and formed by extrusion; a shaft hole is provided at the middle part of the circular outer ring.

Specifically, the annular ring body is an axisymmetric structural body.

Specifically, at least one lightening cavity is circularly arranged inside each of the left ring and the right ring.

More specifically, a cross section of the lightening cavity is of a circular shape, a kidney shape, or a polygonal shape.

Specifically, both the left ring and the right ring are connected to the annular ring body by welding.

More specifically, a lateral part of the left ring docking with the annular ring body is provided with a first annular groove into which an edge of one side of the annular ring body is embedded; a lateral part of the right ring docking with the annular ring body is provided with a second annular groove into which an edge of the other side of the annular ring body is embedded.

Specifically, the circular outer ring is fixedly connected to the lateral part of the right ring through a retaining member.

More specifically, the lateral part of the right ring docking with the circular outer ring is provided with an annular recess into which an edge of the circular outer ring is wedged.

Specifically, the circular outer ring defines at least one through hole configured for reducing weight or ventilation.

A tire, an inner ring of the body of the tire is provided with the aforesaid tire rim structure.

BENEFICIAL EFFECT

The tire rim structure provided by the present application breaks the tire rim into the annular ring body, the left ring superimposed upon one side of the annular ring body, the right ring superimposed upon the other side of the annular ring body, and the circular outer ring connected to the right ring, such that each part constituting the tire rim structure can be formed by extrusion or stamp techniques. Compared with existing tire rims formed integrally through casting technique, this tire rim structure provides increased consistency, thus allowing for increased structural strength and thus stronger structural strength. Furthermore, since the extrusion and stamp techniques are simpler and have lower implementation difficulty as compared with integrally casting technique, the manufacturing technique for the tire rim can be simplified, which improves the production efficiency.

The present invention further provides a tire; an inner side of the tire body is provided with the aforesaid tire rim structure. Since the aforesaid tire rim structure is high in structural strength, light in weight, and simple in manufacturing techniques, the tire provided by the application has a high price/performance ratio.

DETAILED DESCRIPTION OF THE PREFERRED EMBODIMENT

In order to make the purposes, technical solutions, and advantages of the present application more clear, the present application will be further described in detail hereinafter with reference to accompanying drawings and embodiments. It should be understood that the specific embodiments described herein are merely intended to explain but not to limit the present application.

Figure 1:
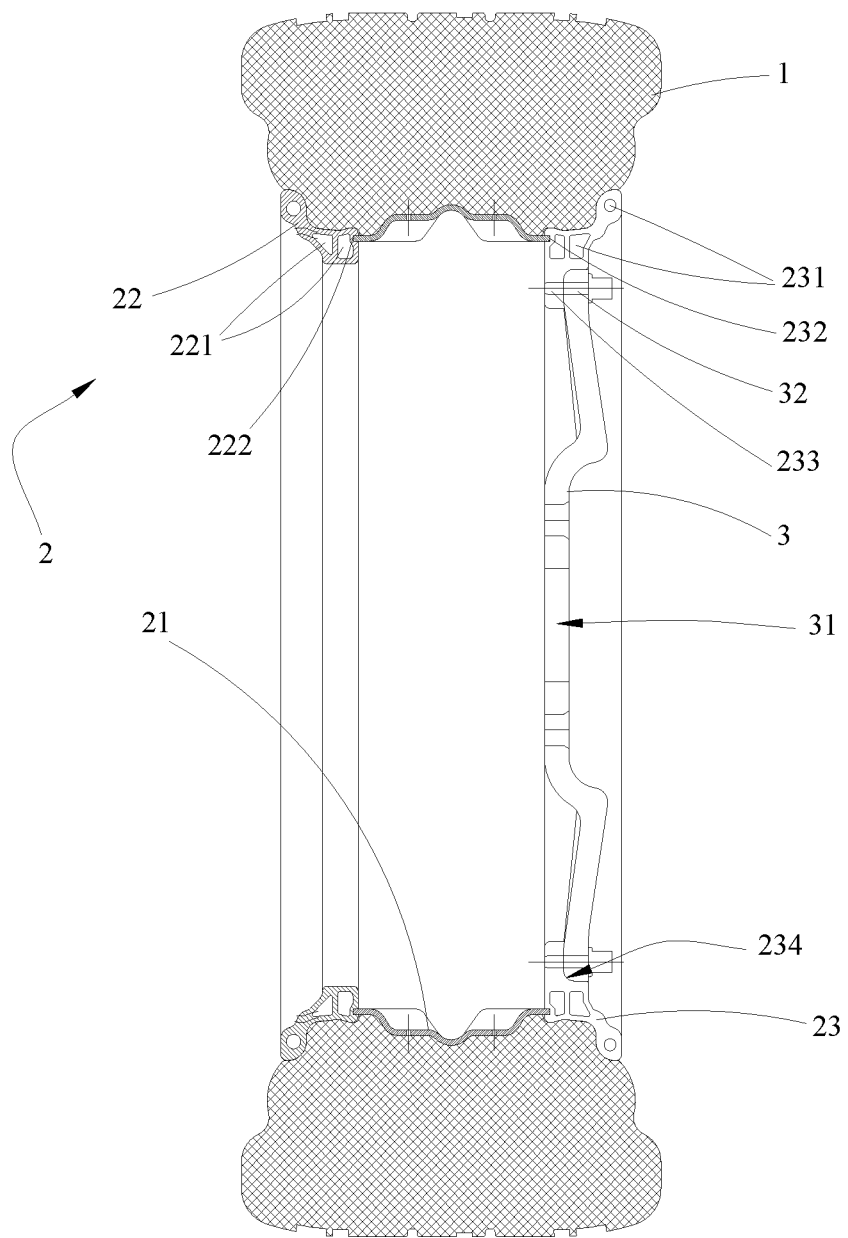
FIG. 1 is a sectional schematic view of a tire rim structure assembled with a tire body provided by an embodiment of the present application.
Figure 2:
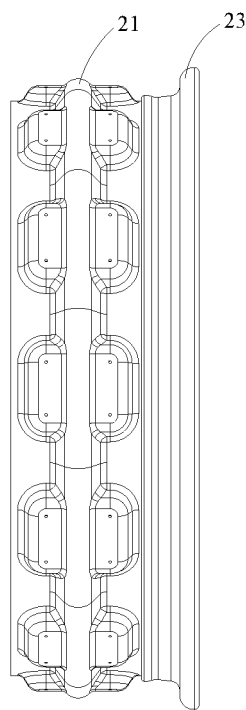
FIG. 2 is a front view of the annular ring body of the tire rim structure assembled with the right ring provided by the embodiment of the present application.
Figure 3:
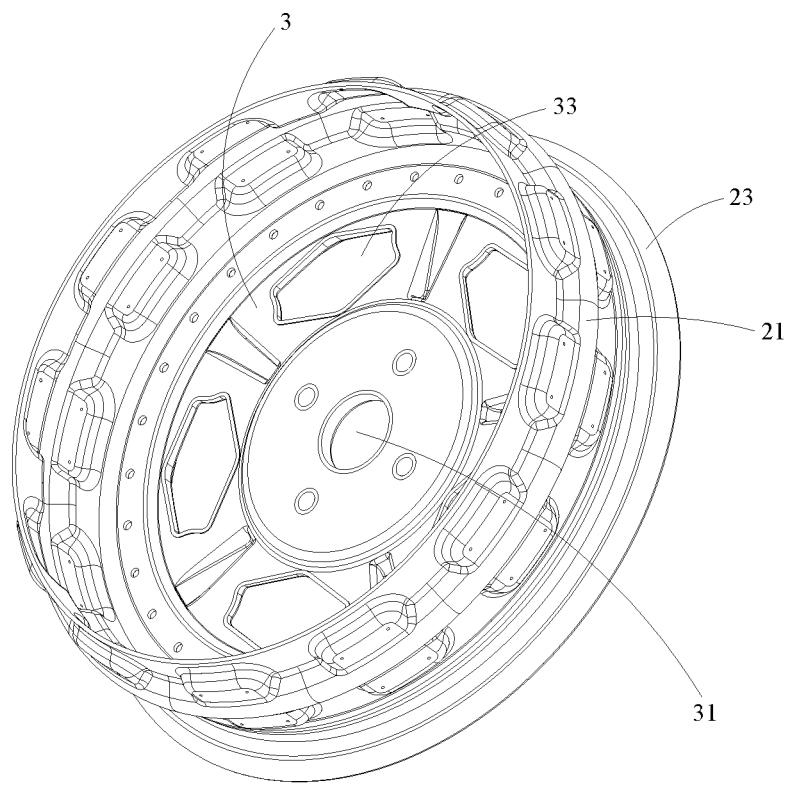
FIG. 3 is a perspective schematic view of the annular ring body, the right ring, and the outer ring of the tire rim structure assembled together provided by the embodiment of the present application.
Figure 4:
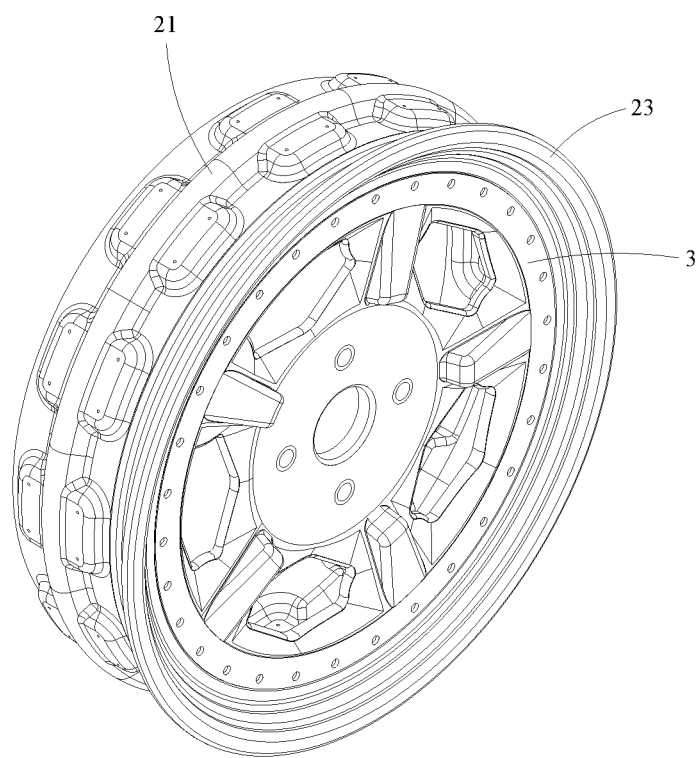
FIG. 4 is another perspective schematic view of the annular ring body, the right ring, and the outer ring of the tire rim structure assembled together provided by the embodiment of the present application.

As shown in FIGS. 1-4, the present application provides an example of a tire rim structure, which includes an annular ring 2 provided on an inner ring of a tire body 1 and a circular outer ring 3 provided on an outside of the tire body 1, fixedly connected to the annular ring 2, and formed by stamping. The annular ring 2 herein represents an inner ring close to an inner side of an automobile body when the tire body 1 is mounted in an automobile. The outer ring 3 is opposite to the inner ring 2 and located on an outer side of the automobile body. The annular ring 2 includes an annular ring body 21 formed by extrusion, an annular left ring 22 provided at one side of the annular ring body 21 and formed by extrusion, and an annular right ring 23 provided at another side of the annular ring body 21, connected to the circular outer ring 3, and formed by extrusion; a shaft hole 31 is defined at the middle part of the circular outer ring 3. The shaft hole 31 is configured for mounting an output shaft of a hub driving motor of an automobile therein. Specifically, the annular ring body 21, the left ring 22 and the right ring 23 can be formed by extrusion utilizing aluminum or magnalium material; the circular outer ring 3 can be formed by stamp utilizing aluminum or manalium material. The tire rim structure provided by the present application breaks down the tire rim into the annular ring 2 and the circular outer ring 3 and the annular ring 2 and the circular outer ring 3 which are formed separately, and breaks down the annular ring 2 into the annular ring body 21, the left ring 22 and the right ring 23 separately, and the annular ring body 21, the left ring 22 and the right ring 23 are formed by extrusion separately, such that the annular ring 2 can be formed by extrusion technique and the circular outer ring 3 can be formed by stamp technique. Structural parts manufactured by extrusion and stamp techniques possess higher consistency than casting parts, therefore, the tire rim structure provided by the present application has better structural stability and anti-fatigue and impact resistance performances, such that the manufactured tire rim structure possesses a higher structural strength. On the other hand, since the tire rim structure provided by the present application may be processed by extrusion and stamp techniques, compared with casting formation technique, the implementation difficulty of the process is lower and the manufacturing technique is simpler. Therefore, the manufacturing cost can be reduced and the production efficiency can be improved, which is helpful for promotion and use.

Specifically, in order to make the structural stability of the annular ring body 21 higher and the annular ring body 21 more convenient to be produced and processed, the annular ring body 21 can be an axisymmetric structural body.

Specifically, at least one lightening cavity 221/231 is circularly arranged inside each of the left ring 22 and the right ring 23; the lightening cavities 221, 231 can be configured appropriately according to shapes of the left ring 22 and the right ring 23. In this embodiment provided by the present application, three lightening cavities 221 arranged around the body of the left ring 22 are inside the left ring 22; three lightening cavities 231 arranged around the body of the right ring 23 are inside the right ring 23. The arrangement of the lightening cavities 221, 231 can not only lighten the whole weight of the annular ring 2, but also save material.

More specifically, the cross section of the lightening cavities 221, 231 can be of a circular shape, a kidney shape, or a polygonal shape, etc., which can be set appropriately according to the sectional shapes of the left ring 22 and the right ring 23 and will not be described in detail herein.

Specifically, both the left ring 22 and the right ring 23 are connected with the annular ring body 21 by welding; this connecting mode is simple and reliable.

More specifically, a lateral part of the left ring 22 docking with the annular ring body 21 is provided with a first annular groove 222 into which an edge of one side of the annular ring body 21 can be embedded; a lateral part of the right ring 23 docking with the annular ring body 21 is provided with a second annular groove 232 into which an edge of the other side of the annular ring body 21 can be embedded. The annular ring body 21 is connected to the left ring 22 and the right ring 23 respectively in an embedded mode, thus allowing for quick positioning during assembling and improving structural stability. Welding positions between the annular ring body 21 and the left ring 22 and the right ring 23 can be chosen at the first annular groove 222 and the second annular groove 232, thus not easy for desoldering.

Specifically, the circular outer ring 3 is fixedly connected to the lateral part of the right ring 23 through a retaining member such as a screw, a rivet, etc. Correspondingly, the position of the right ring 23 docking with the circular outer ring 3 defines mounting holes 233, 32 for the retaining member to run through respectively.

Furthermore, the lateral part of the right ring 23 docking with the circular outer ring 3 is provided with an annular recess 234 into which an edge of the circular outer ring 3 can be wedged. Specifically, an inner surface of the annular recess 234 is a curved surface constituted by rotating an L-shaped curve by 360 degrees, therefore, it is convenient for the circular outer ring 3 to be positioned and mounted quickly, and the connection between the circular outer ring 3 and the right ring 23 can be steadier. Furthermore, the mounting hole 32 of the circular outer ring 3 can be arranged on a sidewall of the annular recess 234.

Furthermore, the circular outer ring 3 is provided with at least one through hole 33 configured for reducing weight or ventilation. The through hole 33 can be of a circular shape, a kidney shape, or a polygonal shape, etc., thereby reducing the weight of the circular outer ring 3 as well as air resistance suffered by the circular outer ring 3 when an automobile is driving.

The present application further provides a tire, an inner ring of the tire body 1 is provided with the aforesaid tire rim structure. The tire can be a single-cavity tubeless pneumatic tire, or a multi-cavity tubeless pneumatic tire. Since the tire rim structure is high in structural strength, light in weight, and simple in manufacturing techniques, the tire provided by the present application has a high price/performance ratio.

The above contents are only preferred embodiments of the present invention, and are not intended to limit the present invention. Any improvements, equivalent replacements and modifications made within the spirit and principle of the present invention should be contained within the protection scope of the present invention.

What is claimed is:

1. A tire rim structure, wherein the tire rim structure comprises an annular ring arranged in contact with and supporting an inner ring of a tire body and a circular outer ring provided at an inside of the tire body, fixedly connected to the annular ring, and formed by stamping;
   the annular ring includes an annular ring body formed by extrusion, an annular left ring provided at one side of the annular ring body and formed by extrusion, and an annular right ring provided at the other side of the annular ring body, connected to the circular outer ring, and formed by extrusion;
   a shaft hole is provided at a middle part of the circular outer ring;
   wherein the annular ring and the circular outer ring are formed separately;
   wherein the right ring comprises a middle portion and a protruding portion provided with a mounting hole; the circular outer ring is fixedly connected to the right ring through a retaining member; and
   wherein a lateral part of the middle portion and a lateral part of the protruding portion defining an annular recess into which an edge of the circular outer ring is wedged, and the mounting hole is arranged at a lateral part of the annular recess; and
   wherein a lateral part of the left ring docking with the annular ring body is provided with a first annular groove into which an edge of one side of the annular ring body is embedded; a lateral part of the right ring docking with the annular ring body is provided with a second annular groove into which an edge of the other side of the annular ring body is embedded.

2. The tire rim structure of claim 1, wherein the annular ring body is an axisymmetric structural body.

3. The tire rim structure of claim 1, wherein at least one lightening cavity is circularly arranged inside each of the left ring and the right ring.

4. The tire rim structure of claim 3, wherein a cross section of the lightening cavity is of a circular shape, a kidney shape, or a polygonal shape.

5. The tire rim structure of claim 1, wherein both the left ring and the right ring are connected to the annular ring body by welding.

6. The tire rim structure of claim 1, wherein the circular outer ring is fixedly connected to the lateral part of the protruding portion of the right ring through the retaining member.

7. The tire rim structure of claim 1, wherein the circular outer ring defines at least one through hole configured for reducing weight or ventilation.

8. A tire, comprising:
a tire body having an inner ring,
wherein the inner ring of the tire body of the tire is provided with a tire rim structure;
wherein the tire rim structure comprises an annular ring arranged in contact with and supporting the inner ring of the tire body and a circular outer ring provided at an inside of the tire body, fixedly connected to the annular ring, and formed by stamping;
the annular ring includes an annular ring body formed by extrusion, an annular left ring provided at one side of the annular ring body and formed by extrusion, and an annular right ring provided at the other side of the annular ring body, connected to the circular outer ring, and formed by extrusion;
a shaft hole is provided at a middle part of the circular outer ring;
wherein the annular ring and the circular outer ring are formed separately;
wherein the right ring comprises a middle portion and a protruding portion provided with a mounting hole; the circular outer ring is fixedly connected to the right ring through a retaining member; and
wherein a lateral part of the middle portion and a lateral part of the protruding portion defining an annular recess into which an edge of the circular outer ring is wedged, and the mounting hole is arranged at a lateral part of the annular recess; and
wherein a lateral part of the left ring docking with the annular ring body is provided with a first annular groove into which an edge of one side of the annular ring body is embedded; a lateral part of the right ring docking with the annular ring body is provided with a second annular groove into which an edge of the other side of the annular ring body is embedded.

9. The tire rim structure of claim 2, wherein the circular outer ring defines at least one through hole configured for reducing weight or ventilation.

10. The tire rim structure of claim 3, wherein the circular outer ring defines at least one through hole configured for reducing weight or ventilation.

11. The tire rim structure of claim 4, wherein the circular outer ring defines at least one through hole configured for reducing weight or ventilation.

12. The tire rim structure of claim 5, wherein the circular outer ring defines at least one through hole configured for reducing weight or ventilation.

13. The tire rim structure of claim 1, wherein the circular outer ring defines at least one through hole configured for reducing weight or ventilation.

14. The tire rim structure of claim 6, wherein the circular outer ring defines at least one through hole configured for reducing weight or ventilation.

* * * * *